United States Patent

[11] 3,621,024

| [72] | Inventor | Hans Alfred Nieper<br>Sedanstrasse 21, 3 Hanover, Germany |
|---|---|---|
| [21] | Appl. No. | 775,539 |
| [22] | Filed | Nov. 13, 1968 |
| [45] | Patented | Nov. 16, 1971 |
| [32] | Priority | Nov. 15, 1967 |
| [33] | | Great Britain |
| [31] | | 52,034/67 |

[54] THERAPEUTICALLY EFFECTIVE CALCIUM DIOROTATE
1 Claim, No Drawings

[52] U.S. Cl. ..................................... 260/256.4,
260/260, 424/251
[51] Int. Cl. ........................................ C07d 51/30
[50] Field of Search............................ 260/260,
256.4 C

[56] References Cited
UNITED STATES PATENTS
2,937,175  5/1960  Scriabine...................... 260/260

OTHER REFERENCES
Villari et al., Chem. Abstracts, 52:20630 (1958)

*Primary Examiner* — Alex Mazel
*Assistant Examiner* — R. J. Gallagher
*Attorney* — Cushman, Darby & Cushman ABSTRACT: The novel therapeutically valuable compound calcium diorotate, of the structural formula

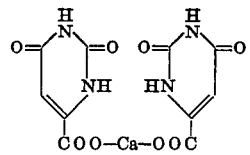

and therapeutic compositions containing calcium diorotate.

THERAPEUTICALLY EFFECTIVE CALCIUM DIOROTATE

This invention relates to a new chemical compound of therapeutic value and to therapeutic compositions containing the same.

According to a first feature of the present invention, there is provided, the compound calcium diorotate, (i.e., the calcium salt of orotic acid) having the structural formula

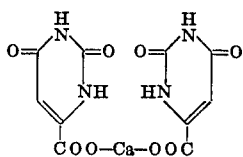

Calcium diorotate is synthetized by treatment of an aqueous solution of orotic acid with a soluble calcium salt in an aqueous solution in stoichiometric amount. The calcium salt, such as $CaCl_2$ or $(CH_3COO)_2Ca$ is added slowly with stirring, and calcium diorotate precipitates out, and is filtered. The crystals are washed with hot water and dried.

A white tasteless crystalline powder, is formed. The compound is sparingly soluble in the usual solvents, (i.e., less than 0.25 percent soluble) and the melting point is above 350° C.

According to a further feature of the invention, there are provided new therapeutic compositions which comprises a therapeutic agent as aforesaid, together with a therapeutically acceptable diluent or extender.

Said compositions are suitable for various uses as follows:
  a. Tablets, uncoated, scored or not, or entericoated (gastric juice resistant) containing from 0.100 to 0.5 g. of the therapeutic agent. A suitable daily dose is from 0.200 g. to 1 g.
  b. Suppositories containing from 0.100 g. to 0.5 g. of the therapeutic agent preferably in a highly resorbable suppository mass. A suitable daily dose is 0.200 g. to 1 g.
  c. Sterile aqueous solutions in vials (preferably 10 ml.), for intravenous and/or intramuscular injections, containing 10 percent by weight of the therapeutic agent. A suitable daily dose is 1 to 2 g.
  d. Compositions for application to the skin or to mucous membranes, containing from 0.5 to 5 percent by weight of therapeutic agent, such as ointment bases or lotion in aqueous resorbable solution, emulsion or suspension.
  e. Ophthalmic preparations such as collyrium containing 0.1 to 2 percent by weight of the therapeutic agent, in an isotonic buffered aqueous solution.

The compound under its various dosage forms has been found to be active in the treatment of:
  1. Overweight
  2. Skin diseases such as: psoriasis
  3. Inflammatory diseases such as:
     a. arteritis
     b. thrombophlebitis
     c. retinitis
     d. chronic hepatitis
     3. cholitis mucosa
  4. Arteriosclerosis
  5. Atherosclerosis
  6. Autoimmune diseases
     a. multiple sclerosis
     b. disseminated encephalitis
  7. Inflammatory and osteoporotic decalcification.

I claim as my invention:
  1. The compound calcium diorotate, having the structural formula:

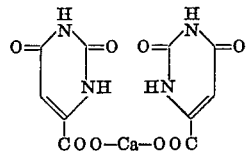

* * * * *